Feb. 14, 1956 — J. J. SHAPIRO — 2,734,991
INTERFERENCE WEDGE MONOCHROMATOR
Filed May 24, 1954 — 2 Sheets-Sheet 1
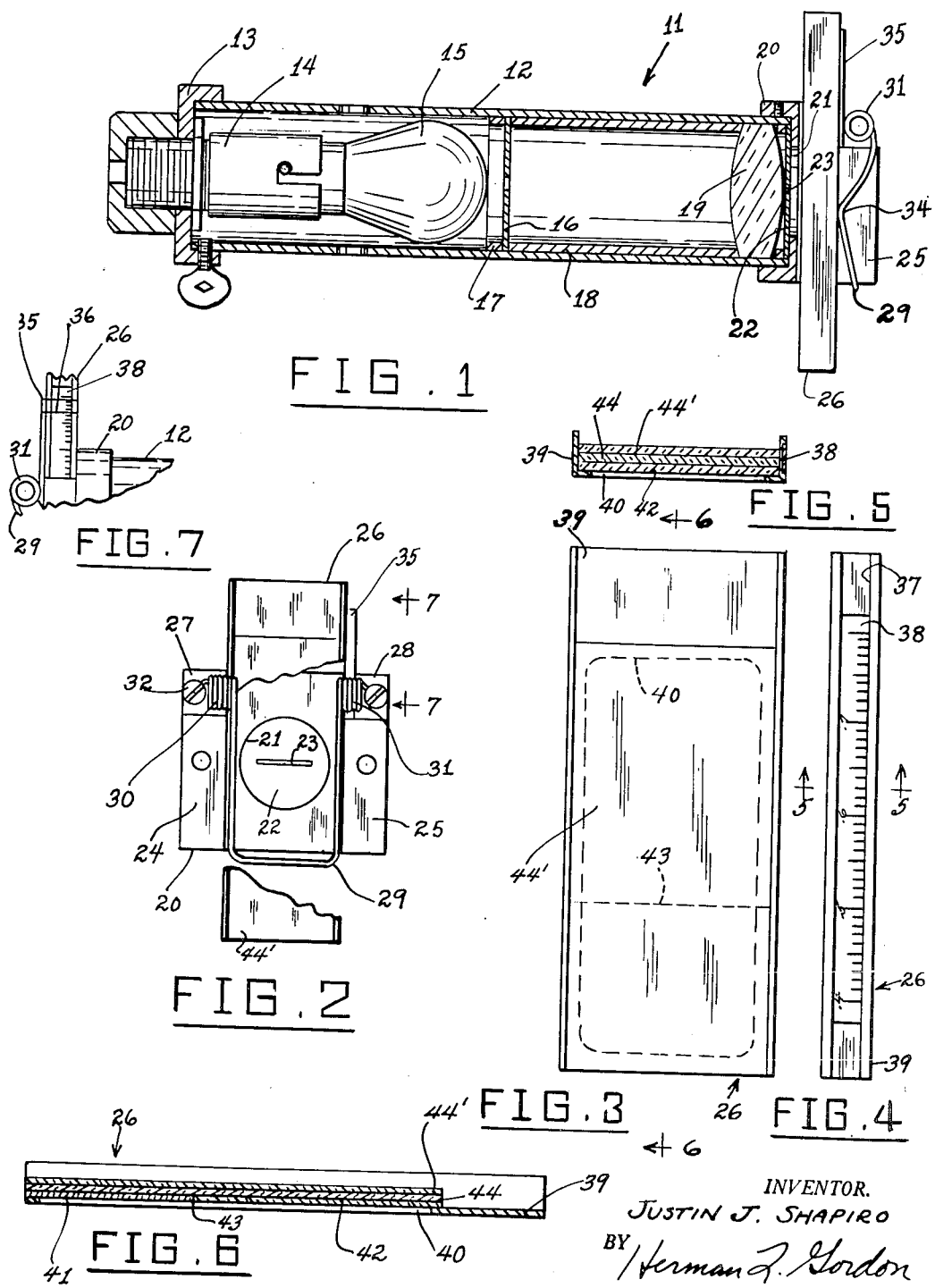
INVENTOR.
JUSTIN J. SHAPIRO
BY Herman L. Gordon
ATTORNEY

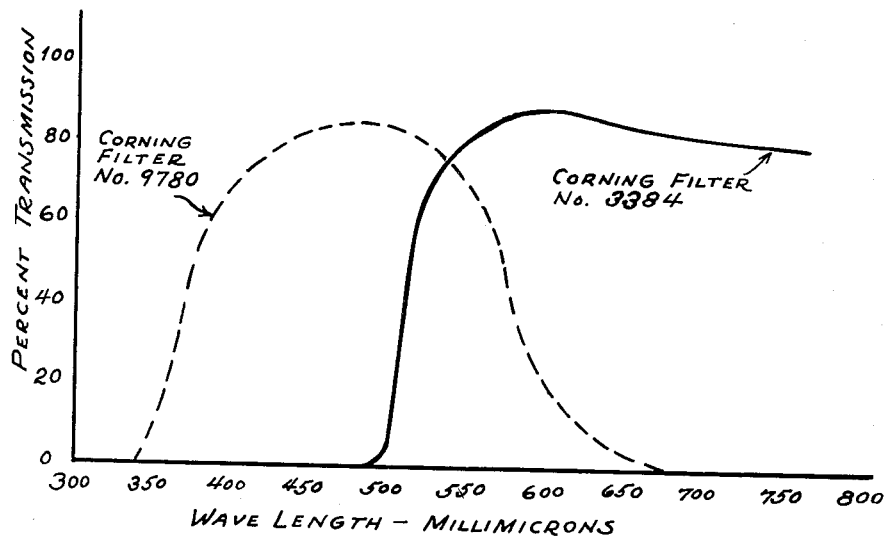
FIG.8
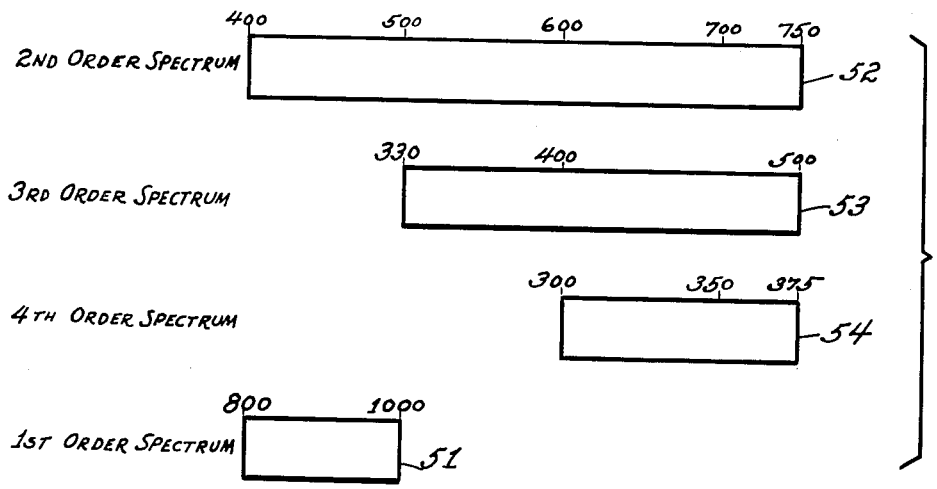
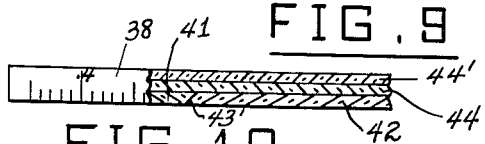
FIG.9
FIG.10
INVENTOR.
JUSTIN J. SHAPIRO
BY Herman L. Gordon
ATTORNEY

United States Patent Office 2,734,991
Patented Feb. 14, 1956

2,734,991

INTERFERENCE WEDGE MONOCHROMATOR

Justin J. Shapiro, Montgomery County, Md., assignor to American Instrument Company, Inc., Silver Spring, Md.

Application May 24, 1954, Serial No. 431,829

7 Claims. (Cl. 240—1)

This invention relates to monochromators, and more particularly to a monochromator of the interference wedge type which is calibrated to give a direct reading of the wavelength of the monochromatic light selected by the device.

A main object of the invention is to provide a novel and improved monochromator which is simple in construction, which is easy to operate, and which provides any selected value of pure monochromatic light over a wide range of the visible spectrum.

A further object of the invention is to provide an improved monochromator which is inexpensive to manufacture, which is direct reading, which is compact in size, and which is rugged in construction.

Further objects and advantages of the invention will become apparent from the following description and claims, and from the accompanying drawings, wherein:

Figure 1 is a longitudinal vertical cross-sectional view taken through an improved monochromator constructed in accordance with the present invention.

Figure 2 is an end elevational view of the monochromator of Figure 1 with a portion of the interference wedge unit broken away.

Figure 3 is an enlarged plan view of the interference wedge assembly employed in the monochromator of Figure 1.

Figure 4 is a side elevational view of the interference wedge assembly of Figure 3.

Figure 5 is a cross-sectional view taken on line 5—5 of Figure 4.

Figure 6 is a cross-sectional view taken on line 6—6 of Figure 3.

Figure 7 is a fragmentary side elevational view taken on line 7—7 of Figure 2.

Figure 8 is a graph showing the color transmission characteristics of the filter plates employed in a typical monochromator according to this invention.

Figure 9 is a diagram graphically illustrating the transmission of various orders of spectral components through an interference wedge element similar to that employed in the interference wedge assembly of the monochromator of the present invention.

Figure 10 is an enlarged fragmentary side elevational view, partly in cross-section, of a modified form of wedge assembly.

Referring to the drawings, the improved monochromator is designated generally at 11. Said monochromator comprises a tubular housing 12 to the rear end of which is secured a cover bracket 13 on which is mounted a lamp socket 14 which is thus supported axially in the rear end portion of housing 12. Mounted in the socket 14 is the lamp 15, which is the source of light employed and which, of course, provides wavelengths covering the intended range of the device. The lamp is of the clear type and the filament thereof is located along the axis of the housing 12.

Designated at 16 is a centrally apertured stop plate which is mounted in the housing 12 forwardly adjacent lamp 15 between a stop ring 17 and a spacer sleeve 18 secured in the housing. Mounted in the end of housing 12 opposite cover bracket 13 is a collimating lens 19 arranged so that the filament of lamp 15 is at the focal point of the lens. Thus, parallel rays are obtained from the forward side of the lens.

Secured to the forward end of housing 12 is a bracket member 20 having the large circular central aperture 21. Designated at 22 is a disc member which is secured in the forward end of housing 12 between lens 19 and the bracket member 20, said disc member being formed with a slit 23 arranged diametrically with respect to the circular opening 21. Bracket member 20 is formed with parallel side rib elements 24 and 25 located on opposite sides of opening 21 and defining a channel therebetween for slidably receiving the interference wedge assembly, shown at 26. The slit 23 extends at right angles to the channel side walls 24 and 25.

The bracket member 20 is formed with recessed portions 27 and 28 at the ends of the channel side walls 24 and 25. Designated at 29 is a U-shaped retaining spring formed at the end portions of its side arms with coil spring elements 30 and 31, the ends of said coil spring elements being anchored to the recessed portions 27 and 28 by suitable screws 32.

The side arms of the U-shaped spring member 29 are bent inwardly at their intermediate portions, as shown at 34, to clampingly engage the respective longitudinal marginal portions of the intereference wedge assembly 26.

Secured to the end portion 28 of rib 25 and having its inner surface substantially flush with the inner surface of said rib 25 is a transparent indicator tab 35, said tab being inscribed with an index line 36 which extends transverse to the edge of the interference wedge assembly 26, as shown in Figure 7. The edge of said assembly 26 is formed with a channel or groove 37 in which is secured the wavelength scale 38.

The wedge assembly 26 comprises a channel-shaped body 39, of metal or the like, having the large rectangular aperture 40 formed therein. Cemented in the body over the aperture 40 are the glass filter plates 41 and 42, said plates having different filtering characteristics, as will be presently explained, and having transverse abutting edges cemented together at 43.

Cemented on the filter plates 41 and 42 are the interference wedge plates 44 and 44', which may be similar to Catalogue No. 33–80–02 Interference Wedges, manufactured by Bausch and Lomb Optical Company, Rochester, New York.

For precise colorimetric work, a "pure" spectrum is required, wherein no other than one wavelength can be found at any one point of the spectrum.

In interference wedge monochromators heretofore employed, the wedge must, at every portion of the spectrum, pass some other wavelength multiples of a basic wavelength.

In the device of the present invention, a spectrum of substantial extent is available, extending from about 400 to about 800 millimicrons. Employing a "second order" wedge, such as a Bausch and Lomb Interference Wedge, Catalogue No. 33–80–02, at any given position, for example, at the position nominally designated 400 millimicrons, 800 millimicrons appears as an equal intensity component; at the position 500 millimicrons, both 330 and 1000 millimicron components appear; at 600 millimicrons, both 400 and 300 millimicron components appear; at 750 millimicrons, both 500 and 375 millimicron components appear.

Such an unmodified wedge would be useless in a monochromator intended for precise colorimetric work. In accordance with the present invention, the wedge is modified by cementing the mosaic of colored glass filters 41 and 42 along the wedge in such a manner that at any position along the wedge, only the nominally marked wavelength component can pass, all undesired multiples and submultiples being absorbed by the glass filters.

In the typical embodiment of the present invention described herein, Corning No. 9780 and 3384 filters are employed respectively at 41 and 42. The filters are cut and cemented to the Bausch and Lomb wedge so that the junction 43 of the filters falls on the 520 millimicron position on the wedge. With this arrangement, no other than the nominally marked wavelength can appear at any one position. A pure spectral component is thus obtained from the collimated light passing through the slit 23, through the filter, and through the interference wedges 44, 44', for each position of the wedge assembly 26, the wavelength value of the spectral component being given by observing the position of the indicator index line 36 on the scale 38.

As shown in Figure 8, filter plate 41 (Corning filter No. 9780) has maximum transmission between 330 and 650 millimicrons, whereas, filter plate 42 (Corning filter No. 3384) has maximum transmission between about 500 and 750 millimicrons.

The wedges 44 and 44' are identical, each being a second order wedge, and if so desired, only a single one of said wedges may be employed. However, by using two of the wedges superimposed, the band pass characteristics of the resultant wedge unit are substantially narrowed.

Referring to Figure 9, the top or second order spectrum, designated by the block 52, is the desired transmission of the composite interference wedge. The other spectra, designated by the blocks 53, 54 and 51, represent additional light transmission at corresponding positions on the wedge. The third order spectrum, represented by the block 53, consists of wavelengths two-thirds of the desired wavelength, the fourth order spectrum, represented by block 54, consists of wavelengths one half of the desired wavelength, and the first order spectrum, designated by block 51, consists of wavelengths twice the desired wavelength.

Since filter plate 41 (Corning No. 9780) will pass only wavelengths between about 350 and 650 millimicrons to any substantial degree of intensity, below the 520 millimicron position on the wedge the first order spectrum is completely suppressed, and the third order spectrum is almost completely suppressed.

Since filter plate 42 (Corning No. 3384) will not pass wavelengths below about 500 millimicrons with any substantial degree of intensity, the third and fourth order spectra are substantially suppressed.

In the modified form of the wedge assembly shown in Figure 10, the member 39 is eliminated and the scale 38 is cemented directly to the longitudinal edges of the members 41, 42, 44 and 44'. The junction between the glass filters 41 and 42 may be made oblique, as shown at 43', to minimize the sharp drop in transmission at this point.

The collimating lens 19 is preferably of the achromatic type.

While a specific embodiment of an interference wedge monochromator has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An interference monochromator comprising a tubular housing, a light source mounted in one end of said housing, a collimating lens mounted in the other end of said housing, a plate having a slit therein, means supporting said plate outwardly adjacent said lens, bracket means secured to said other end of the housing, an interference wedge, a color filter between said wedge and said slit and means slidably supporting said wedge on said bracket means for movement in a direction perpendicular to said slit and normal to the optical axis of said lens.

2. An interference monochromator comprising a tubular housing, a light source mounted in one end of said housing, a collimating lens mounted in the other end of the housing, a plate having a slit therein, means supporting said plate outwardly adjacent said lens, bracket means secured to said other end of the housing, an interference wedge, means slidably supporting said wedge on said bracket means for movement in a direction perpendicular to said slit and normal to the optical axis of said lens, and a color filter secured to said interference wedge between the wedge and said slit.

3. An interference monochromator comprising a tubular housing, a light source mounted in one end of said housing, a collimating lens mounted in the other end of the housing, a plate having a slit therein, means supporting said plate outwardly adjacent said lens, bracket means secured to said other end of the housing, an interference wedge, means slidably supporting said wedge on said bracket means for movement in a direction perpendicular to said slit and normal to the optical axis of said lens, and a color filter secured to said interference wedge between the wedge and said slit, said filter comprising a plurality of transparent colored plates having different color transmission characteristics, said filter plates being in abutment at their edges.

4. An interference monochromator comprising a tubular housing, a light source in one end of said housing, a collimating lens in the other end of the housing, a plate having a slit therein, means supporting said plate outwardly adjacent said lens, bracket means secured to said other end of the housing, an interference wedge, means slidably supporting said wedge on said bracket means for movement in a direction perpendicular to said slit and normal to the optical axis of said lens, and a color filter secured to said interference wedge between the wedge and said slit, said filter comprising a plurality of transparent colored plates having different color transmission characteristics, said filter plates having transverse abutting edges.

5. An interference monochromator comprising a tubular housing, a light source mounted in one end of said housing, a collimating lens mounted in the other end of the housing, a plate having a slit therein, means supporting said plate outwardly adjacent said lens, bracket means secured to said other end of the housing, an interference wedge, means slidably supporting said wedge on said bracket means for movement in a direction perpendicular to said slit and normal to the optical axis of said lens, and a color filter secured to said interference wedge between the wedge and said slit, said filter comprising a pair of transparent colored plates having different color transmission characteristics, said filter plates having transverse abutting edges located at the intermediate portion of said wedge.

6. An interference monochromator comprising a housing, a light source in one end of said housing, a collimating lens in said housing, said light source being at the focus of said lens, a plate having a slit therein, means supporting said plate outwardly adjacent said lens, bracket means secured to the other end of said housing adjacent said plate, an interference wedge, means slidably supporting said wedge on said bracket means for movement transverse to said slit, and a color filter secured to said wedge between the wedge and said plate, said filter comprising a pair of transparent colored plates having different color transmission characteristics, said filter plates having transverse abutting edges located at the intermediate portion of said wedge, one of said filter plates having maximum transmission between approximately 350 and 650 millimicrons, and the other of said filter plates having maximum transmission between approximately 500 and 750 millimicrons, the transverse abutting edges of said filter plates being located at a position along the interference wedge corresponding to a wavelength of between 450 and 650 millimicrons.

7. An interference monochromator comprising a housing, a light source in one end of said housing, a collimating lens in said housing, said light source being at the focus of said lens, a plate having a slit therein, means supporting said plate outwardly adjacent said lens, bracket means secured to the other end of said housing adjacent said plate, an interference wedge, means slidably supporting said wedge on said bracket means for movement transverse to said slit, and a color filter secured to said wedge between the wedge and said plate, said filter comprising a pair of transparent colored plates having different color transmission characteristics, said filter plates having transverse abutting edges located at the intermediate portion of said wedge, one of said filter plates having maximum transmission between approximately 500 and 750 millimicrons, and the other of said filter plates having maximum transmission between approximately 350 and 650 millimicrons, the transverse abutting edges of said filter plates being located at a position along said interference wedge corresponding approximately to a wavelength of 520 millimicrons, whereby other than one order of the wavelengths of visible light reaching and passing through the wedge are substantially completely absorbed by the filter plates References Cited in the file of this patent

UNITED STATES PATENTS

| | | |
|---|---|---|
| 1,810,669 | Loeb | June 16, 1931 |
| 2,206,621 | Van den Akker | July 2, 1940 |
| 2,339,053 | Coleman | Jan. 11, 1944 |